US011249520B2

(12) United States Patent
Han et al.

(10) Patent No.: US 11,249,520 B2
(45) Date of Patent: Feb. 15, 2022

(54) HINGE DEVICE AND FOLDABLE DEVICE HAVING SAME

(71) Applicant: GOOGLE LLC, Mountain View, CA (US)

(72) Inventors: Jungmin Han, Cupertino, CA (US); Sangsoo Park, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 38 days.

(21) Appl. No.: 16/946,900

(22) Filed: Jul. 10, 2020

(65) Prior Publication Data

US 2021/0018961 A1 Jan. 21, 2021

Related U.S. Application Data

(60) Provisional application No. 62/876,197, filed on Jul. 19, 2019.

(51) Int. Cl.
*G06F 1/16* (2006.01)
*E05D 1/00* (2006.01)
*F16C 11/12* (2006.01)

(52) U.S. Cl.
CPC .............. *G06F 1/1681* (2013.01); *E05D 1/00* (2013.01); *F16C 11/12* (2013.01); *G06F 1/1652* (2013.01); *E05Y 2900/606* (2013.01)

(58) Field of Classification Search
CPC combination set(s) only.
See application file for complete search history.

(56) References Cited

U.S. PATENT DOCUMENTS

| | | | |
|---|---|---|---|
| 9,250,733 B2 | 2/2016 | Lee et al. | |
| 9,348,450 B1 * | 5/2016 | Kim | G06F 1/1681 |
| 9,760,126 B2 * | 9/2017 | Shin | G06F 1/1652 |
| 9,964,995 B1 * | 5/2018 | Morrison | G06F 1/1622 |
| 10,013,022 B1 * | 7/2018 | Aurongzeb | G06F 1/1681 |
| 10,082,838 B1 * | 9/2018 | Hong | E05D 7/00 |
| 10,104,787 B2 * | 10/2018 | Rothkopf | G06F 1/1652 |
| 10,180,701 B2 * | 1/2019 | Nakamura | G06F 1/1616 |
| 10,595,604 B1 * | 3/2020 | de la Fuente | G06F 1/1616 |
| 11,068,032 B2 * | 7/2021 | Huang | G06F 1/1616 |
| 11,083,096 B2 * | 8/2021 | Yu | H05K 7/20972 |
| 2021/0132664 A1 * | 5/2021 | Park | H04M 1/0218 |
| 2021/0271294 A1 * | 9/2021 | Liao | F16C 11/04 |
| 2021/0311525 A1 * | 10/2021 | Seo | G06F 1/1641 |
| 2021/0311531 A1 * | 10/2021 | Huang | G06F 1/1616 |

\* cited by examiner

*Primary Examiner* — Lisa Lea-Edmonds
(74) *Attorney, Agent, or Firm* — Brake Hughes Bellermann LLP

(57) ABSTRACT

A foldable device may include a foldable layer and a hinge system that is positioned between a first body and a second body of the foldable device. The hinge device may include a first hinge section and a second hinge section. The first hinge section and the second hinge section may include a rigid, planar body. A third hinge section may be positioned in a space between the first hinge section and the second hinge section. The third hinge section may include a rigid, contoured body.

20 Claims, 6 Drawing Sheets

HINGE DEVICE AND FOLDABLE DEVICE HAVING SAME

CROSS REFERENCE TO RELATED APPLICATION

This application claims priority to U.S. Provisional Application No. 62/876,197, filed on Jul. 19, 2019, the entirety of which is incorporated by reference herein.

TECHNICAL FIELD

This description relates, in general, to a hinge device for a foldable device, and, in particular, to a textile hinge device supporting a foldable display system.

BACKGROUND

Modern computing devices often attempt to achieve a balance between portability and functionality. The desire for a device that provides for a rich display of information on a single surface (suggesting a device having a relatively large form factor) may conflict with the desire to have a device that is small enough to be easily carried and easily accessible (suggesting a device having a relatively small form factor). A flexible, or foldable, device may enhance the capabilities of a computing device, in that, in a folded configuration, the device may have a relatively small form factor, and in an unfolded configuration, the device may take advantage of a relatively large display area. In some situations, mechanisms guiding and supporting the folding and unfolding of such a device may be relatively complex, and susceptible to failure. These complex mechanisms, including, for example, gearing, sliding mechanisms, and the like, may produce a relatively artificial folding motion, and may introduce stress and/or impact on the foldable device, thus damaging components of the display portion of the foldable device. A flexible, and durable hinging system in a foldable area of a foldable device may provide for a more natural, flexible folding and unfolding motion, while still protecting fragile components of a display portion of the foldable device.

SUMMARY

In a general aspect, a hinge system for a foldable display of a foldable computing device may include a first hinge section including a rigid planar body, a second hinge section including a rigid planar body, a third hinge section positioned in a space formed between the first hinge section and the second hinge section, corresponding to a bendable section of the foldable display, wherein the third hinge section includes a rigid contoured body having a first end thereof positioned proximate to a first end of the first hinge section, and a second end thereof positioned proximate to a first end of the second hinge section, such that the first and second hinge sections are movable relative to the third hinge section, and a flexible outer layer coupled to an outer surface of the first hinge section, an outer surface of the second hinge section, and an outer surface of the third hinge section. The flexible layer may include a first hinging area at a portion of the outer layer corresponding to the first end of the first hinge section and the first end of the third hinge section, and a second hinging area at a portion of the outer layer corresponding to the first end of the second hinge section and the second end of the third hinge section.

In some implementations, in a folded configuration of the computing device, a bendable section of the foldable display may be coupled to the first hinge section and the second hinge section, and may be received in an accommodating space defined by the first hinge section, the second hinge section and the third hinge section. In some implementations, in the folded configuration, the first end of the third hinge section may be adjacent to and aligned with the first end of the first hinge section, and the second end of the third hinge section may be adjacent to and aligned with the first end of the second hinge section.

In some implementations, in the folded configuration, the outer layer may be in an unfolded state at the first hinging area, and in the unfolded state at the second hinging area, and, in the unfolded state, the outer layer may be in a folded state at the first hinging area, and in the folded state at the second hinging area. In some implementations, in an unfolded configuration, the first hinge section may be rotated away from the third hinge section about the first hinging area, and the second hinge section may be rotated away from the third hinge section about the second hinging area, such that the first hinge section and the second hinge section are substantially co-planar, and the third hinge section is offset from the first hinge section and the second hinge section. In the unfolded configuration, the bendable section of the foldable display may be moved out of the accommodating space and may be in a substantially planar state. In the unfolded configuration, the outer layer may be in a folded state at the first hinging area, and in the folded state at the second hinging area.

In some implementations, the hinge system may also include a passage extending through the third hinge section. The passage may be configured to guide a wire from the first hinge section to the second hinge section. In some implementations, the first hinge section, the second hinge section and the third hinge section may be made of a rigid plastic material or a rigid metal material, and the outer layer may be made of a flexible textile-based material.

In another general aspect, a computing device may include a first body, a second body, spaced apart from the first body so as to define a space between the first body and the second body, a foldable display extending across a first surface of the first body, across the space between the first body and the second body, and across a first surface of the second body, a third body positioned between the first body and the second body, an outer layer extending across a second surface of the first body opposite the first surface thereof, across an outer surface of third body, and across a second surface of the second body opposite the first surface thereof, a first hinging area defined at a first pivot point between the first body and the third body, and a second hinging area defined at a second pivot point between the second body and the third body.

In some implementations, the space between the first body and the second body may correspond to a bendable section of the foldable display. In some implementations, in a folded configuration of the computing device, a bendable section of the foldable display may be received in an accommodating space defined by the first body, the second body and the third body. In some implementations, in the folded configuration, the outer layer may be in an unfolded state at the first hinging area, and in the unfolded state at the second hinging area.

In some implementations, in an unfolded configuration of the computing device, the first body may be rotated away from the third body about the first hinging area, and the second body may be rotated away from the third body about the second hinging area, such that the first body and the second body are substantially co-planar, and the third body is offset from the first body and the second body. In some implementations, in the unfolded configuration, the bendable section of the foldable display may be moved out of the accommodating space and may be in a substantially planar state. In the unfolded configuration, the outer layer may be in a folded state at the first hinging area, and may be in the folded state at the second hinging area.

Implementations can include one or more of the following features, in isolation, or in any combination with each other.

DETAILED DESCRIPTION

A computing device including a hinge system, in accordance with implementations as described herein, may provide a relatively natural folding and unfolding motion, using a relatively simple, durable, and flexible, mechanism to support the folding and unfolding of a foldable layer of the computing device. The hinge system, in accordance with implementations described herein, may accomplish this without the use of complicated gearing and sliding mechanisms, which would otherwise add to the cost and complexity of the computing device, which produce a relatively unnatural, restrictive folding and unfolding motion, and which can detract from the utility and reliability of the computing device. In some implementations, a hinge system, in accordance with implementations described herein, may make use of rigid materials in combination with flexible materials such as, for example, textile-based materials. A combination of rigid materials and textile materials may yield a relatively simple and reliable hinge system to guide and support the natural folding and unfolding of the computing device including the foldable layer, while still providing support to the foldable layer, and while still maintaining the foldable layer within allowable bending radius limits. In some implementations, for example, in a mode in which the computing device is used as an electronic reading device, the combination of rigid and flexible materials, such as textiles, may enhance the user experience, as such materials may emulate the feeling provided by a book, while still providing the convenience of an electronic reading device.

Figure 1C:
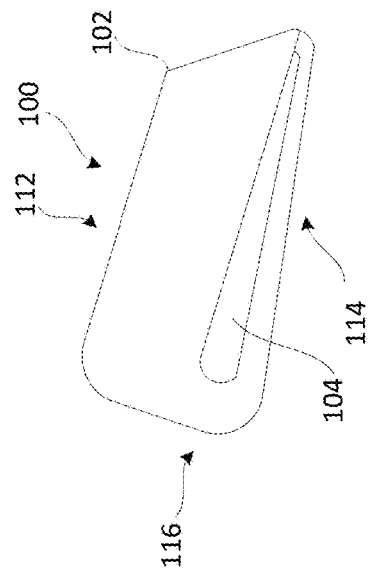
FIGS. 1A-1D illustrate an exemplary computing device including an exemplary foldable display.
Figure 1D:
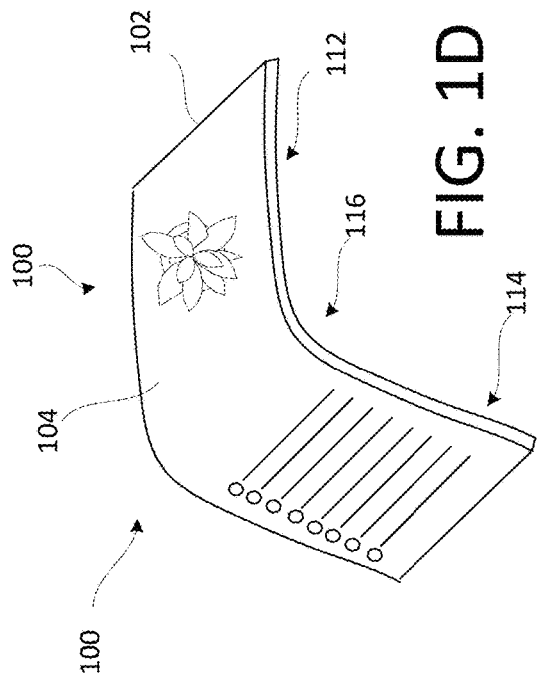
Figure 1A:
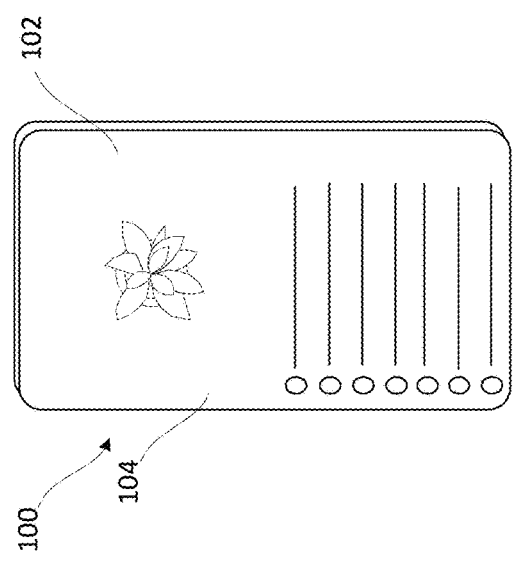
Figure 1B:
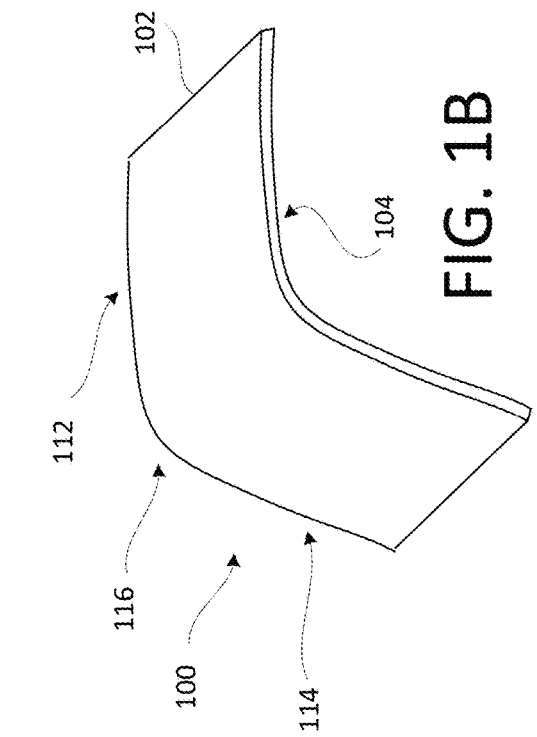

FIGS. 1A-1D illustrate an exemplary computing device 100 that includes a foldable layer 102. In particular, FIG. 1A is a front view of the exemplary computing device 100 in an unfolded configuration. FIG. 1B is a perspective view of the exemplary computing device 100 in a partially folded configuration. FIG. 1C is a side view of the exemplary computing device 100 in a fully folded configuration. FIG. 1D is a perspective view of the exemplary computing device 100 in a partially folded configuration. In the exemplary computing device 100 shown in FIGS. 1B and 1C, the foldable layer 102 is a foldable display 102 that is mounted so that a display surface 104 faces inward in the folded configuration. In the exemplary computing device 100 shown in FIG. 1D, the foldable layer 102 is a foldable display 102 that is mounted so that a display surface 104 faces outward in the folded configuration. The foldable display 102 can include a flexible organic light emitting diode (OLED) layer.

In some implementations, the foldable display 102 can include a first relatively flat, relatively rigid, or-semi-rigid, section 112, a second relatively flat, relatively rigid, or semi-rigid, section 114, and a foldable portion or bendable section 116. In some implementations, the foldable display 102 can include more than two flat, rigid sections 112, 114 and/or more than one bendable section 116. In some implementations, the foldable display 102 can include zero, or only one, flat rigid section 112, 114. For example, when a foldable display 102 includes zero flat rigid sections, the display 102 may be substantially continuously bendable, and may be rolled up, as in a scroll. The exemplary foldable display 102 shown in FIGS. 1A-1D includes a bendable section 116 that allows the foldable display 102 to bend about an axis. In some implementations, the foldable display 102 can include more than one bendable section that allows the flexible display 102 to bend about more than one axis.

In the exemplary computing device 100 shown in FIGS. 1A-1D, the bendable section 116 may allow the foldable display 102 to bend, or fold, for example, in an arcuate shape, that has a bending radius, and/or radius of curvature. In some implementations, a hinge system, in accordance with implementations described herein, may support and guide a folding and an unfolding of the foldable display 102 at the bendable section 116. In some implementations, a hinge system, in accordance with implementations described herein, may prevent the foldable display 102 from bending beyond a minimum bending radius (e.g., less than 10 millimeters, less than 5 millimeters, or less than 2 millimeters) and/or from bending beyond a maximum bending radius, or radius of curvature that may cause damage to fragile components of the foldable display 102.

Figure 2A:
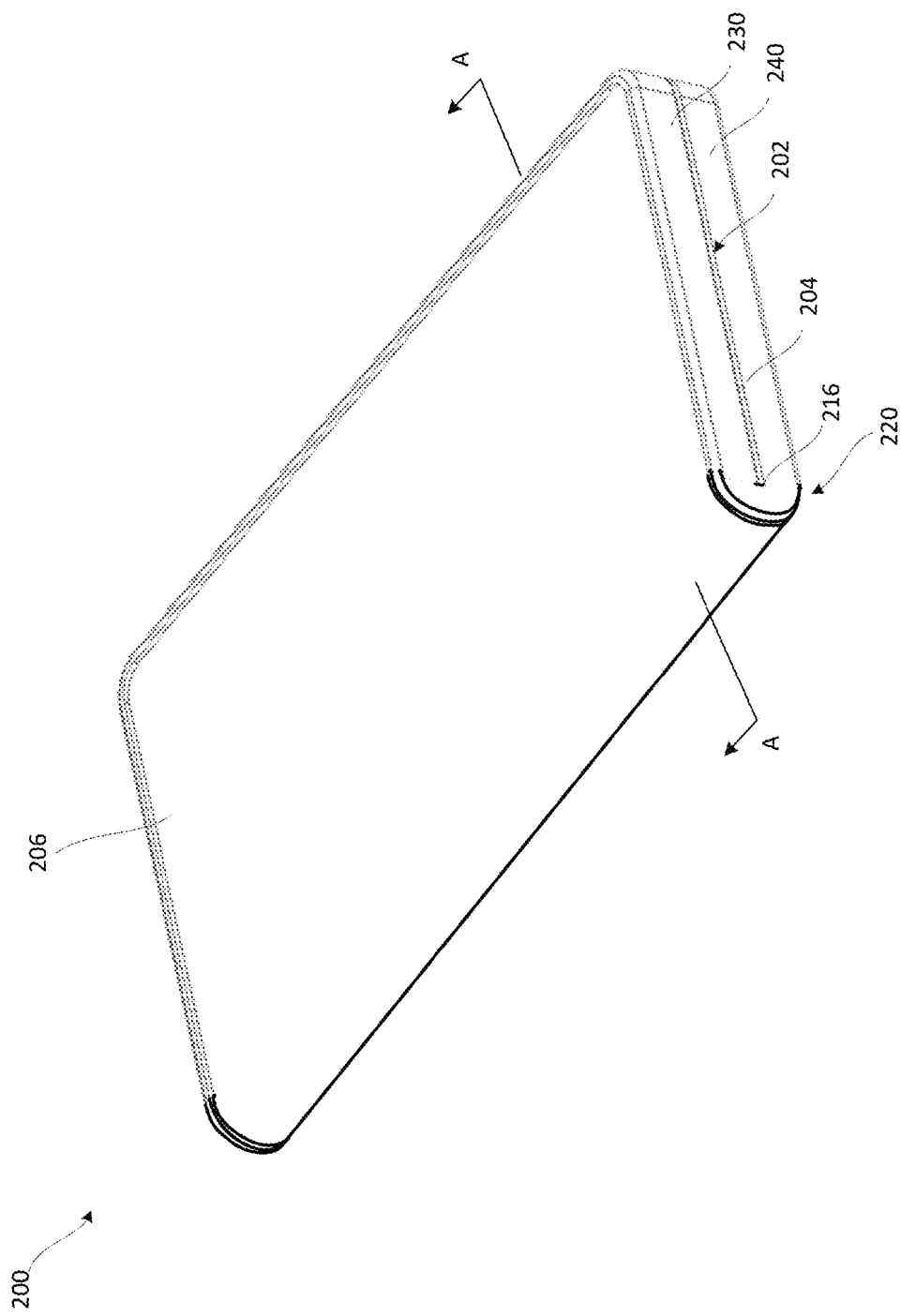
FIG. 2A is a perspective view of an exemplary computing device 200 in a folded configuration, in accordance with implementations described herein.
Figure 2B:
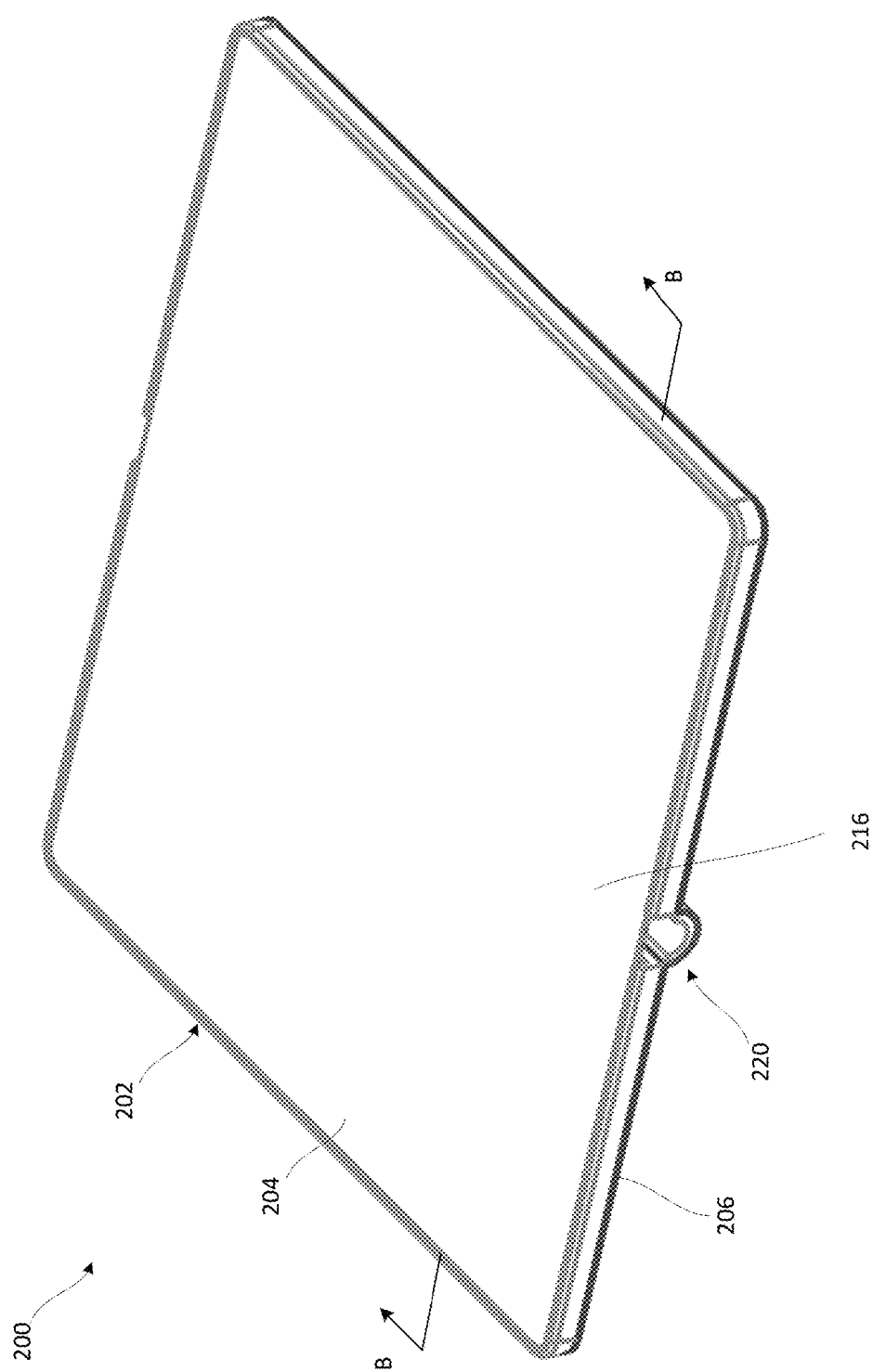
FIG. 2B is a perspective view of the exemplary computing device 200 shown in FIG. 2A, in an unfolded configuration, with a display area of the exemplary computing device 200 facing upward, in accordance with implementations described herein.
Figure 2C:
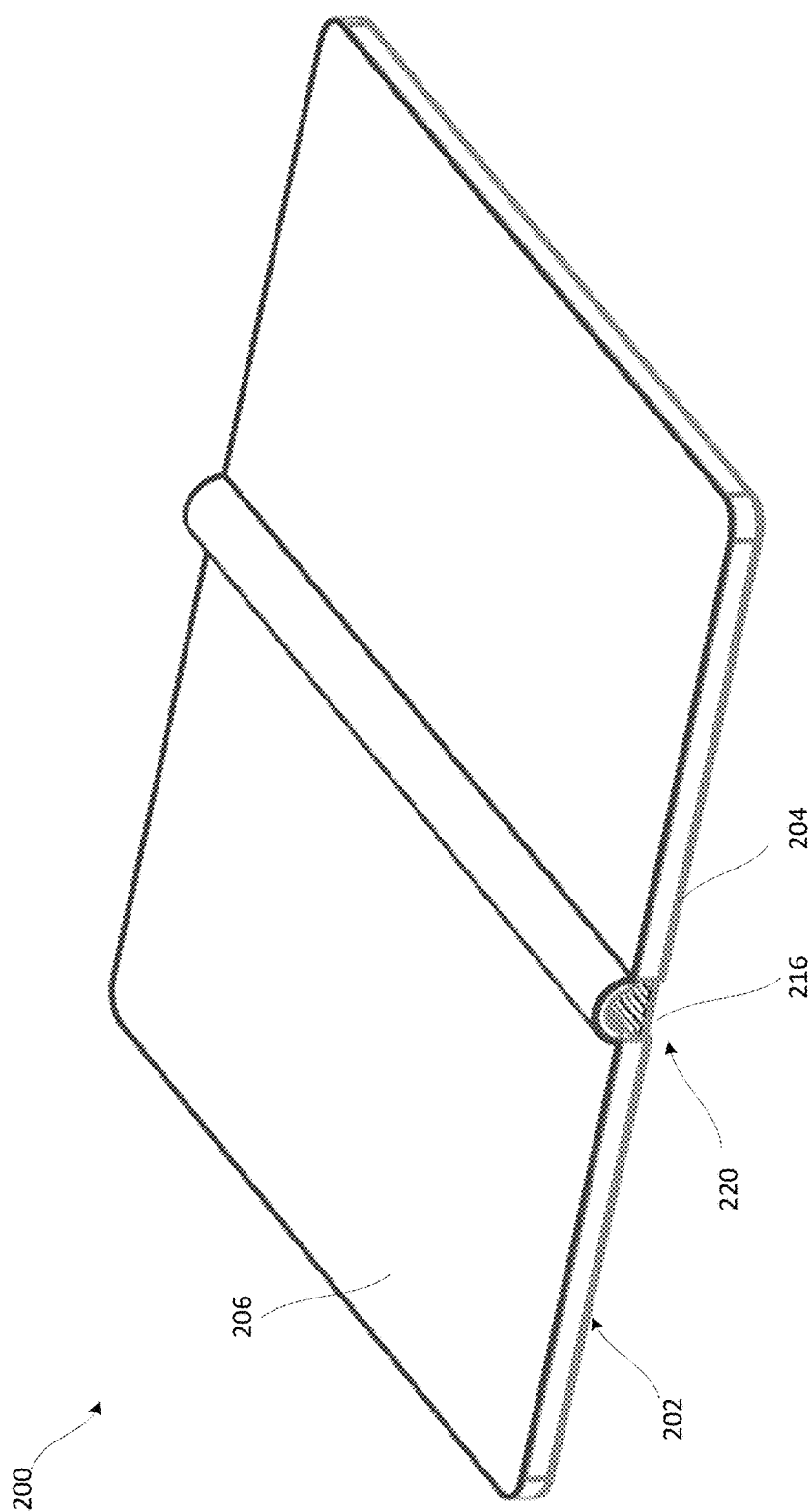
FIG. 2C is a perspective view of the exemplary computing device shown in FIG. 2A, in an unfolded configuration, with the display area facing downward, in accordance with implementations described herein.

FIG. 2A is a perspective view of an exemplary computing device 200 including a foldable layer 202, such as, for example, a foldable display 202, in the folded configuration, in accordance with implementations described herein. FIG. 2B is a perspective view of the exemplary computing device 200 shown in FIG. 2A, in the unfolded configuration, with a display surface 204 facing upward. FIG. 2C is a perspective view of the exemplary computing device 200 shown in FIG. 2A, in the unfolded configuration, with an outer layer 206 facing upward, and the display surface 204 facing downward. The exemplary computing device 200 shown in FIGS. 2A-2C may include a hinge system 220, in accordance with implementations described herein, which may support and guide the folding and the unfolding of the computing device 200 including the foldable display 202.

In the example shown in FIGS. 2A through 2C, the foldable display 202 is mounted on the computing device 200 so that the display surface 204 of the foldable display faces inward when the device 200 is in the folded configuration. However, in some implementations, the foldable display 202 including the hinge system in accordance with implementations described herein may be mounted so that the display surface 204 faces outward when the computing device 200 is in the folded configuration (not shown).

In the example shown in FIGS. 2A through 2C, the foldable display 202 includes a foldable portion 216, or a bendable portion 216. In the example shown in FIGS. 2A through 2C, the bendable portion 216 is at a central portion of the computing device 200, simply for purposes of discussion and illustration. In some implementations, the foldable display 202 can include more, or fewer, bendable sections. In some implementations, the foldable display 202 can be substantially continuously bendable. In the exemplary foldable display 202 shown in FIGS. 2A through 2C, the bendable portion 216 allows the foldable display 202 to bend about an axis. The computing device 200 may include a hinge system 220 at a location in the computing device 200 corresponding to the bendable portion 216 of the foldable display 202. The hinge system 220 may support and guide the folding and the unfolding of the foldable display 202. The hinge system 220 may provide for a relatively natural folding and unfolding motion between the folded configuration shown in FIG. 2A and the unfolded configuration shown in FIGS. 2B and 2C. The exemplary hinge system 220 will be described in more detail below with respect to FIGS. 3A and 3B.

Figure 3A:
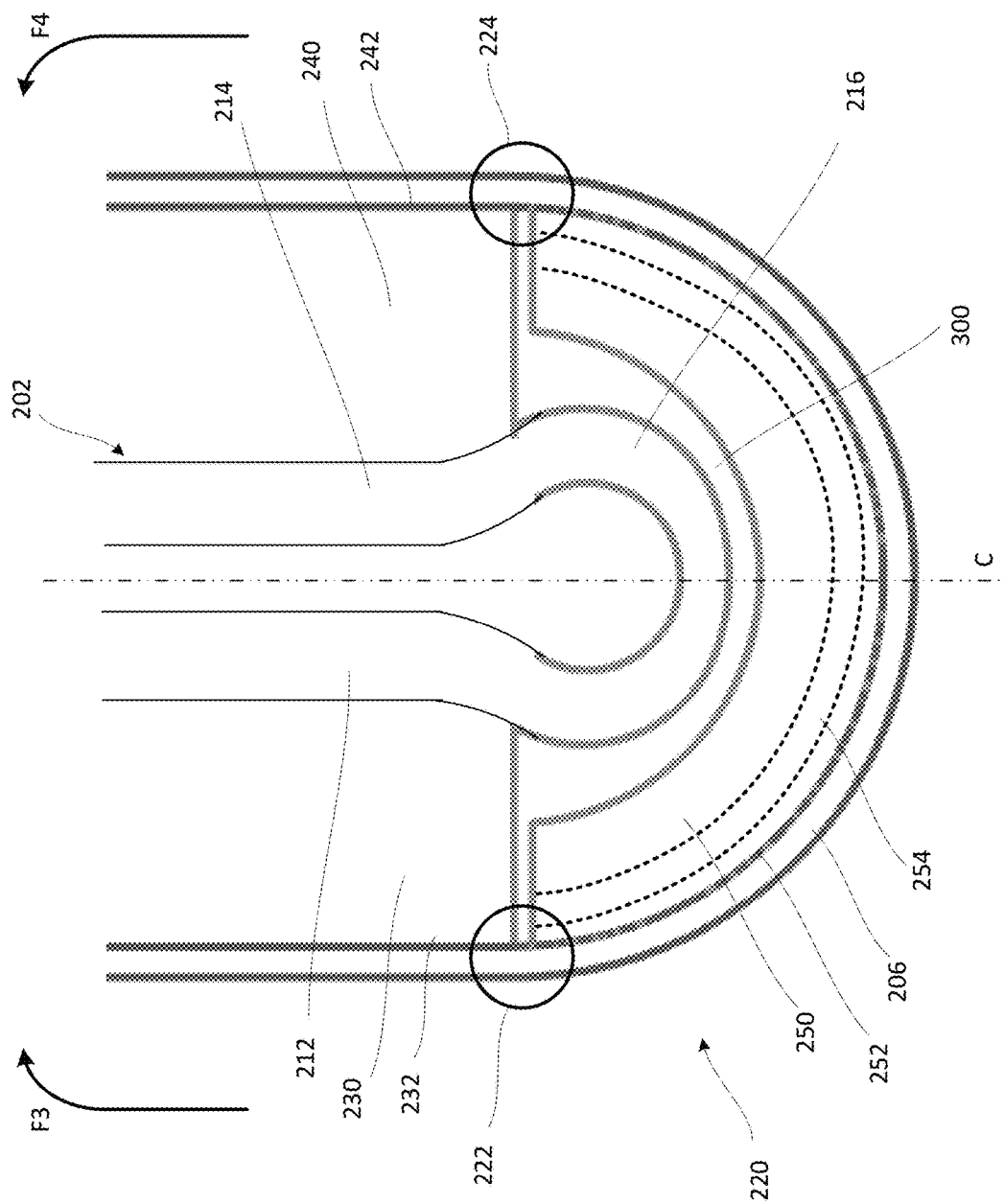
FIG. 3A is a partial cross-sectional view of the exemplary computing device 200 shown in FIGS. 2A-2C, taken along line A-A of FIG. 2A, in accordance with implementations described herein.
Figure 3B:
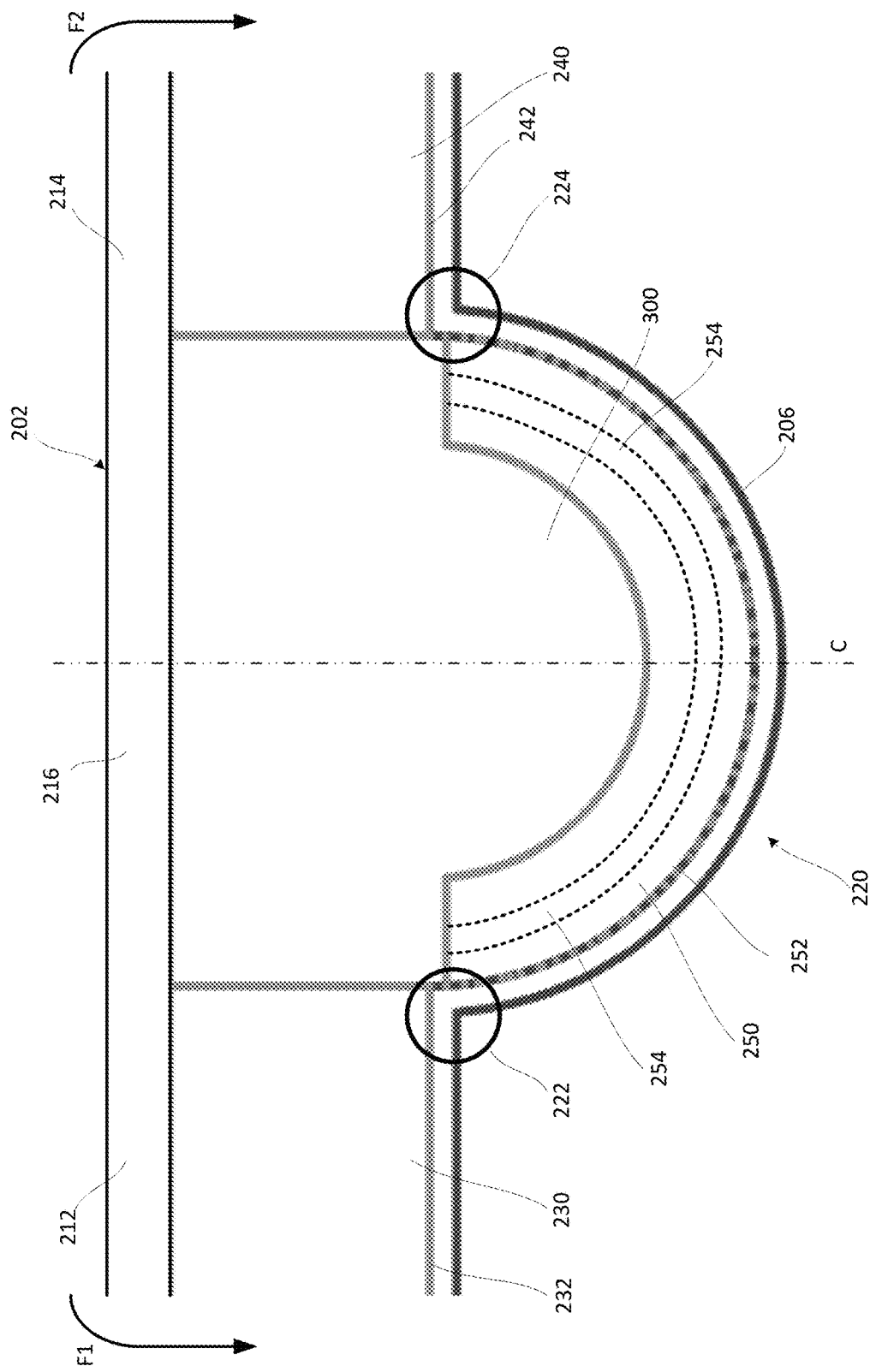
FIG. 3B is a partial cross-sectional view of the exemplary computing device 200 shown in FIGS. 2A-2C, taken along line B-B of FIG. 2B, in accordance with implementations described herein.

FIG. 3A is a partial cross-sectional view of the exemplary computing device 200 in the folded configuration, including the foldable display 202, taken along line A-A of FIG. 2A. FIG. 3B is a partial cross-sectional view of the exemplary computing device 200 in the unfolded configuration, including the foldable display 202, taken along line B-B of FIG. 2B.

As shown in FIGS. 2A through 3B, the hinge system 220 may include a first hinge section 230 and a second hinge section 240. A third hinge section 250 may be positioned in an accommodating space 300 formed between the first hinge section 230 and the second hinge section 240. The space 300 between the first hinge section 230 and the second hinge section 240 may correspond to the bendable portion 216 of the foldable display 202 of the computing device 200. The outer layer 206 may be positioned on a corresponding outer surface 232 of the first hinge section 230, a corresponding outer surface 242 of the second hinge section 240, and a corresponding outer surface 252 of the third hinge section 250. In some implementations, the outer surface 232 of the first hinge section 230 and the outer surface 242 of the second hinge section 240 may be relatively planar. In some implementations, the outer surface 252 of the third hinge section 250 may have a contoured, or curved, or arcuate shape.

In some implementations, the first hinge section 230 and the second hinge section 240 may each include a relatively planar body. The third hinge section 250 may include a contoured body, positioned at respective end portions of the first hinge section 230 and the second hinge section 240. The first hinge section 230, the second hinge section 240 and the third hinge section 250 may be made of a relatively rigid material. In some implementations, the first hinge section 230, the second hinge section 240 and the third hinge section 250 may be made of a semi-rigid material. The outer layer 206 may be made of a relatively flexible material. For example, in some implementations, the outer layer 206 may be, for example, a textile-based material, or a fabric material. In some implementations, the outer layer 206 may be made of a flexible resin-based material such as, for example, a vinyl material. In come implementations, the outer layer may be made of a flexible elastomeric polymer material such as, for example, a rubber material. In some implementations, one or more of the first hinge section 230, the second hinge section 240 and/or the third hinge section 250 may be solid. In some implementations, one or more of the first hinge section 230, the second hinge section 240 and/or the third hinge section 250 may be hollow. In some implementations, one or more of the first hinge section 230, the second hinge section 240 and/or the third hinge section 250 may solid in some portion(s), and hollow in other portion(s) thereof. In some implementations, the first hinge section 230 may be coupled to a first portion of a housing of the computing device 200. In some implementations, the first hinge section 230 may define, or partially define, the first portion of the housing of the computing device 200. In some implementations, the second hinge section 240 may be coupled to a second portion of a housing of the computing device 200. In some implementations, the second hinge section 240 may define, or partially define, the second portion of the housing of the computing device 200.

The outer layer 206 may be coupled to the outer surfaces 232, 242, 252 of the first, second and third hinge sections 230, 240, 250 in a variety of different manners. For example, in some implementations, the outer layer 206 may be adhered to the first hinge section 230 and/or to the second hinge section 240 and/or to the third hinge section 250 using a chemical bonding agent that laminates the outer layer 206 to the first and/or second and/or third hinge section 230, 240, 250. In some implementations, a pressure sensitive adhesive may affix the outer layer 206 to the first hinge section 230 and/or to the second hinge section 240 and/or to the third hinge section 250.

In some implementations, the third hinge section 250 may have a passage 254 formed therethrough. In some implementations, the passage 254 may allow one or more wires to pass therethrough. Wire(s) passing through the passage 254 formed in the second hinge section 250 may provide for electrical connection(s) and/or power connection(s) between one or more components received in a first portion of the computing device 200 corresponding to the first hinge section 230 and components received in a second portion of the computing device 200 corresponding to the second hinge section 240.

As shown in the exemplary implementation illustrated in FIGS. 3A and 3B, the first hinge section 230, the second hinge section 240, and the third hinge section 250 are separate elements or members. In the folded configuration shown in FIG. 3A, the first and second hinge sections 230, 240 are aligned substantially symmetrically with respect to the third hinge section 250, and with respect to a central axis C of the computing device 200. In the unfolded configuration shown in FIG. 3B, the first hinge section 230 and the second hinge section 240 relatively co-planar, while the third hinge section 250 is aligned along a different plane or axis, or offset from the first hinge section 230 and the second hinge section 240. The separation of the first, second and third hinge sections 230, 240, 250, together with the arrangement of the first, second and third hinge sections 230, 240, 250, may allow for independent relative movement of the first hinge section 230, the second hinge section 240 and the third hinge section 240.

As shown in FIGS. 3A and 3B, a first hinging area 222 may be defined at a portion of the hinge system 220 where the first hinge section 230 and the third hinge section 250 meet. The first hinging area 222 may define a pivot point about which the first hinge section 230 may move, or rotate, relative to the third hinge section 250. A second hinging area 224 may be defined at a portion of the hinge system 220 where the second hinge section 240 and the third hinge section 250 meet. The second hinging area 224 may define a pivot point about which the second hinge section 240 may move, or rotate, relative to the third hinge section 250. As shown in FIG. 3A, in the folded configuration, the outer layer 206 may be in an unfolded state at the first hinging area 222 and the second hinging area 224. As shown in FIG. 3B, in the unfolded configuration, the outer layer 206 may be in a folded state, or a crimped state, or a bent state, at the first hinging area 222 and the second hinging area 224.

The independent movement of the first hinge section 230 relative to the third hinge section 250, together with the outer layer 206 adhered to the outer surfaces 232, 252 of the first and third hinge sections 230, 250, may provide for a pivoting, or hinging type of motion, at the first hinging area 222. The hinging motion at the first hinging area 222 allows a first portion 212 of the foldable display 202 to be folded and unfolded about the bendable portion 216 of the foldable display 202. Similarly, the independent movement of the second hinge section 240 relative to the third hinge section 250, together with the outer layer 206 adhered to the outer surfaces 242, 252 of the second and third sections 240, 250, may provide for a pivoting, or hinging type of motion, at the second hinging area 242. The hinging motion at the second hinging area 242 allows a second portion 214 of the foldable display 202 to be folded and unfolded about the bending portion 216 of the foldable display 202.

As the first hinge section 230 moves, or pivots, or rotates (at the first hinging area 222) in a direction away from the third hinge section 250, in response to an unfolding force or action applied in the direction of the arrow F1, and/or the second hinge section 240 moves, or pivots, or rotates (at the first hinging area 222) in a direction away from the third hinge section 250, in response to an unfolding force or action applied in the direction of the arrow F2, the bendable portion 216 of the foldable display 202 may be drawn out of the space 300 between the first, second and third hinge sections 230, 240, 250, to approach a more planar state (i.e., from the folded configuration shown in FIG. 3A to the unfolded configuration shown in FIG. 3B). Planarity of the bendable section 216 of the foldable display 202, as shown in FIG. 3B, may be achieved by the forces resulting from the movement of the first and second hinge section s 230, 240 away from the third hinge section 250, and the natural biasing of the first and second hinge sections 230, 240 in the directions of the arrows F1 and F2 in the unfolded configuration due to, for example, gravity.

Similarly, as the first hinge section 230 moves, or pivots, or rotates (at the first hinging area 222) in a direction toward the third hinge section 250 in response to a folding force or action applied in the direction of the arrow F3, and/or the second hinge section 240 moves, or pivots, or rotates (at the second hinging area 224) in a direction toward the third hinge section 250 in response to a folding force or action applied in the direction of the arrow F4, the bendable portion 216 of the foldable display 202 may be bent, or folded, into the space between the first, second and third hinge sections 230, 240, 250 (i.e., from the unfolded configuration shown in FIG. 3B to the folded configuration shown in FIG. 3A). In the example implementation shown in FIGS. 2A through 3B, the bendable portion 216 of the foldable display 202 is accommodated within the space 300 between the first, second and third hinge sections 230, 240, 250 of the hinging system 220 in the folded configuration. In this exemplary implementation, at least a portion of the bendable portion 216 of the foldable display 202 may be substantially freely moving within the space.

In the example implementations shown in FIGS. 2A through 3B, the third hinge section 250 of the hinging system 220 is arcuate, and relatively symmetrical. In some implementations, the third hinge section 250 may have other contours, or shapes. For example, in some implementations, the third hinge section 250 of the hinging system 220 may be elongated, so that the bendable portion 216 of the foldable display 202 may be more easily accommodated within the space between the first, second and third hinge sections 230, 240, 250 of the hinge system 220. In some implementations, an internal surface of the third hinge section 250 may be contoured so as to correspond to the folded, or bent contour of the bendable portion 216 of the foldable display 202 in the folded configuration. In some implementations, the third hinge section 250 of the hinge system 220 may be rectangular, or square, or ovoid, or other shape. In some implementations, the third hinge section 250 of the hinging system 220 may be irregularly shaped. A contour of the third hinge section 250 may be selected so that the bendable section 216 of the foldable display 202 may be accommodated in the space 300 without exceeding the allowable bending limits of the foldable display 202.

As noted above, in some implementations, the use of an outer layer 206 made of a textile-based, fabric material, in combination with a contoured third hinge section 250 may provide the user with a book-like feel when the computing device is in the unfolded configuration. This may enhance the user's experience when the computing device 200 functions as an electronic reading device, with the outer layer 206 simulating the feel of a cover of a book, and the contour of the third hinge section 250 simulating the spine of a book.

In a computing device including a hinge system, in accordance with implementations as described herein, a relatively simple, and relatively reliable, mechanism may support the folding and unfolding of a foldable display, with a relatively natural motion. The hinge device may accomplish this without the use of complicated gearing and sliding mechanisms which add cost and complexity, which produce a relatively unnatural, restrictive folding and unfolding motion, and which may detract from the utility and reliability of the computing device. This relatively simple and reliable hinge device may guide and support the folding and unfolding of the computing device including the foldable display, while still providing support to the foldable display, and while still maintaining the foldable display within allowable bending radius limits.

The devices and apparatuses described herein can be included as part of a computing device, that includes, for example, a processor for executing instructions and a memory for storing the executable instructions. Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, and an, are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A hinge system for a foldable display of a foldable computing device, the hinge system comprising:
    a first hinge section including a rigid planar body;
    a second hinge section including a rigid planar body;
    a third hinge section positioned in a space formed between the first hinge section and the second hinge section, the third hinge section corresponding to a bendable section of the foldable display, wherein the third hinge section includes a rigid contoured body having a first end thereof positioned proximate to a first end of the first hinge section, and a second end thereof positioned proximate to a first end of the second hinge section, such that the first and second hinge sections are movable relative to the third hinge section; and
    a flexible outer layer coupled to an outer surface of the first hinge section, an outer surface of the second hinge section, and an outer surface of the third hinge section, the flexible layer including:
        a first hinging area at a portion of the outer layer corresponding to the first end of the first hinge section and the first end of the third hinge section; and
        a second hinging area at a portion of the outer layer corresponding to the first end of the second hinge section and the second end of the third hinge section.

2. The hinge system of claim 1, wherein, in a folded configuration of the computing device, a bendable section of the foldable display coupled to the first hinge section and the second hinge section is received in an accommodating space defined by the first hinge section, the second hinge section and the third hinge section.

3. The hinge system of claim 2, wherein, in the folded configuration of the computing device, the first end of the third hinge section is adjacent to and aligned with the first end of the first hinge section, and the second end of the third hinge section is adjacent to and aligned with the first end of the second hinge section.

4. The hinge system of claim 2, wherein,
    in the folded configuration of the computing device, the outer layer is in an unfolded state at the first hinging area, an in the unfolded state at the second hinging area, and
    in the unfolded configuration of the computing device, the outer layer is in a folded state at the first hinging area, and in the folded state at the second hinging area.

5. The hinge system of claim 2, wherein, in an unfolded configuration of the computing device, the first hinge section is rotated away from the third hinge section about the first hinging area, and the second hinge section is rotated away from the third hinge section about the second hinging area, such that the first hinge section and the second hinge section are substantially co-planar, and the third hinge section is offset from the first hinge section and the second hinge section.

6. The hinge system of claim 5, wherein, in response to an unfolding action applied to the first hinge section and the second hinge section, the bendable section of the foldable display transitions from a bent state within the accommodating space to a substantially planar state outside of the accommodating space.

7. The hinge system of claim 6, wherein, in the unfolded configuration of the computing device, the outer layer is in a folded state at the first hinging area, and in the folded state at the second hinging area.

8. The hinge system of claim 5, wherein, in response to a folding action applied to the first hinge section and the second hinge section, the bendable section of the foldable display transitions from a substantially planar state outside of the accommodating space to a bent state within the accommodating space.

9. The hinge system of claim 8, wherein, in the folded configuration of the computing device, the outer layer is in an unfolded state at the first hinging area, and in the unfolded state at the second hinging area.

10. The hinge system of claim 1, further comprising a passage extending through the third hinge section, wherein the passage is configured to guide at least one wire from the first hinge section to the second hinge section.

11. The hinge system of claim 1, wherein the first hinge section, the second hinge section and the third hinge section are made of a rigid plastic material or a rigid metal material, and the outer layer is made of a flexible textile-based material.

12. A computing device, comprising:
a first body;
a second body, spaced apart from the first body so as to define a space between the first body and the second body;
a foldable display extending across a first surface of the first body, across the space between the first body and the second body, and across a first surface of the second body;
a third body positioned between the first body and the second body;
an outer layer extending across a second surface of the first body opposite the first surface thereof, across an outer surface of third body, and across a second surface of the second body opposite the first surface thereof;
a first hinging area defined at a first pivot point between the first body and the third body; and
a second hinging area defined at a second pivot point between the second body and the third body.

13. The computing device of claim 12, wherein the space between the first body and the second body corresponds to a bendable section of the foldable display.

14. The computing device of claim 12, wherein, in a folded configuration of the computing device, a bendable section of the foldable display is received in an accommodating space defined by the first body, the second body and the third body.

15. The computing device of claim 14, wherein, in the folded configuration off the computing device, the outer layer is in an unfolded state at the first hinging area, and in the unfolded state at the second hinging area.

16. The computing device of claim 14, wherein, in an unfolded configuration of the computing device, the first body is in a position that is rotated away from the third body about the first hinging area, and the second body is in a position that is rotated away from the third body about the second hinging area, such that the first body and the second body are substantially co-planar, and the third body is offset from the first body and the second body.

17. The computing device of claim 16, wherein, in response to an unfolding action applied to the first hinging area and the second hinging area, the bendable section of the foldable display transitions from a bent state within the accommodating space to a substantially planar state outside of the accommodating space.

18. The computing device of claim 17, wherein, in the unfolded configuration of the computing device, the outer layer is in a folded state at the first hinging area, and is in the folded state at the second hinging area.

19. The computing device of claim 17, wherein, in response to a folding action applied to the first hinge section and the second hinge section, the bendable section of the foldable display transitions from a substantially planar state outside of the accommodating space to a bent state within the accommodating space.

20. The computing device of claim 19, wherein, in the folded configuration of the computing device, the outer layer is in an unfolded state at the first hinging area, and is in the unfolded state at the second hinging area.

* * * * *